US006606383B1

(12) United States Patent
Robinson et al.

(10) Patent No.: US 6,606,383 B1
(45) Date of Patent: Aug. 12, 2003

(54) AUTOMATIC REMOTE TERMINATION SENSING AND LINE POWERING SCHEME

(75) Inventors: Steven M. Robinson, Madison, AL (US); Jason Perry Lyon, Huntsville, AL (US); John S. McGary, Petersburg, TN (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/294,652

(22) Filed: Apr. 19, 1999

(51) Int. Cl.[7] ............................................. H04M 19/00
(52) U.S. Cl. ..................................... 379/413; 379/93.09
(58) Field of Search ............................... 379/413, 93.09

(56) References Cited

U.S. PATENT DOCUMENTS

| 4,679,232 A | | 7/1987 | Brooks et al. ............. 379/413 |
| 4,953,200 A | * | 8/1990 | Yamasaki ................... 379/156 |
| 5,138,658 A | | 8/1992 | Carter et al. ............... 379/413 |
| 5,216,704 A | | 6/1993 | Williams et al. ............ 379/93 |
| 5,335,272 A | | 8/1994 | Lofmark et al. ............ 379/413 |
| 5,721,774 A | * | 2/1998 | Stiefel ........................ 379/324 |
| 5,754,644 A | | 5/1998 | Akhteruzzaman ........... 379/413 |
| 5,854,839 A | * | 12/1998 | Chen et al. ................. 379/377 |
| 5,991,885 A | * | 11/1999 | Chang et al. ............... 710/62 |

* cited by examiner

Primary Examiner—Forester W. Isen
Assistant Examiner—Daniel Swerdlow
(74) Attorney, Agent, or Firm—Allen, Dyer, Doppelt, Milbrath & Gilchrist, P.A.

(57) ABSTRACT

A processor controlled mechanism automatically determines from a location such as a central office whether termination equipment installed at a remote end of a wireline link is span-powered, or is powered locally. It then applies a voltage to the wireline link that is appropriate for the identified type of termination equipment. This eliminates the need for two separate central office loop-powering devices. In the course of making the determination, nothing higher than a safety extra low voltage is applied to the wireline link, to comply with Underwriter's Laboratory standards for locally powered customer premises equipment.

17 Claims, 2 Drawing Sheets

US 6,606,383 B1

AUTOMATIC REMOTE TERMINATION SENSING AND LINE POWERING SCHEME

FIELD OF THE INVENTION

The present invention relates in general to wireline telecommunication communication systems, and is particularly directed to mechanism for automatically determining from a location such as a central office whether equipment installed at a remote end of a wireline link is span-powered, or is powered locally exclusive of the wireline link, and then applying a voltage to the wireline link that is appropriate for the identified type of remote termination equipment.

BACKGROUND OF THE INVENTION

In addition to sending telecommunication signals, such as audio (e.g., voice), video and data over (copper) wirelines, service providers may also use the same set of copper lines to supply power (typically referred to as 'loop powering') to a piece of telecommunication equipment (terminating device) that is installed at a location up to several miles away. While the power required may be very small or relatively large, depending upon device type, loop powering often requires the application of a relatively large voltage (e.g., on the order of 130 VDC) to the wireline link, and is used extensively on mid-span devices of digital dataphone service (DDS), integrated services digital network (ISDN), digital T1 transport, and high data rate digital subscriber loop (HDSL) networks.

For other types of telecommunication equipment, the terminating device is located inside the customer's premises, and is powered 'locally' from within the customer's premises. Where the termination device is locally powered, there is no need to apply a very large voltage to the wireline link from the central office for powering the remote device; instead, it is only essential that the link carry a relatively small 'sealing current'—in order to prevent corrosion in the copper of the wireline loop. Operation of a termination device in the customer's premises does not depend upon the presence of sealing current.

Due primarily to the continuing improved performance of telecommunication equipment, the distance at which the termination device may be located relative to the central office, and therefore the length of the connecting phone lines has increased. Because of this increase in copper loop length, the use of high voltage sources in the central office is necessary, in order to provide any significant amount of power to a remote termination device that is loop powered.

On the other hand, for the case of a very long copper loop to a remotely powered termination device, the voltage that must be applied to the loop for providing sealing current remains relatively low, since sealing current itself is a very small current. Moreover, it is an Underwriter's Laboratory (UL) requirement that any voltage supplied from the central office and made available at a customer's premises must be a 'Safety Extra Low Voltage' (SELV), the current specification for which is a voltage not to exceed a value on the order of 60 volts.

It will be appreciated therefore that the type of device installed in the telephone company's central office for powering the (copper) wireline will depend on what type of termination device is located at the remote end of the loop. On the one hand a central office device having a SELV type voltage supply is needed for terminating devices that are locally powered; on the other hand, a central office device with a high voltage supply is needed for devices that are span powered. This creates two problems.

First, the telephone company must purchase and stock two types of central office loop powering devices. In addition to being more costly to the telephone company, using two different devices adds to the complexity of the overall communication system. Secondly, since the person installing the central office device cannot see what terminates the remote end of the copper loop, there is the possibility that a high voltage device will be installed at the central office, when in reality the remote end is terminated by locally powered customer's premises equipment. Delivering a substantial loop powered voltage (e.g., on the order of 130 VDC) to a locally powered remote termination device is prohibited.

SUMMARY OF THE INVENTION

In accordance with the present invention, this twofold problem is effectively obviated by a new and improved central office-installable scheme, that is operative to automatically determine whether a termination device installed at a remote end of a wireline link is span-powered, or is powered locally exclusive of the wireline link. Once this determination has been made, the invention is effective to apply a voltage to the wireline link that is appropriate for the determined type of termination device. This eliminates the need for two separate central office loop-powering devices. In the course of making this determination, nothing higher than an SELV is supplied to the wireline link, so as to comply with UL standards for locally powered customer premises equipment.

For this purpose, the present invention employs a loop powering switch that is controlled by a microprocessor to selectively apply to the wireline loop one of two loop-powering voltages: an SELV compliant +/−48 volts, readily available in most central offices, and +/−130 volts. The default connection is the +/−48 volt supply to ensure compliance with the UL code requirement referenced above. Via a differential amplifier coupled to a loop current resistor installed in the wireline loop, an amplified voltage representative of the magnitude of wireline current is coupled to a comparator to determine the presence of loop current. The output of the comparator is coupled to the control processor, which is programmed to execute a prescribed remote termination sensing and wireline powering routine.

Pursuant to this routine, the line is first checked to detect whether it is connected to any remote termination device. For this purpose, an SELV voltage is applied to the loop via the switch and the voltage across the current sense resistor is monitored for the presence of loop current. If there is no loop current, it is inferred that there is no remote termination, and the wireline remains default-coupled to the SELV voltage. Once loop current is detected, implying that the wireline is coupled to a remote termination device, the routine determines what type of remote termination is at the far end of the loop.

To this end, the connection with the SELV supply is interrupted, to reduce the voltage applied to the loop to zero volts and, using the digital communication line card, a digital communication connection over the loop with the remote termination is attempted. If there is a response from the remote termination device, it is inferred that the remote termination is locally powered, and the loop voltage is changed back to the SELV voltage, so as to provide sealing current to the loop. If there is no response, it is inferred that the remote termination is span-powered, and the span-powering voltage (130 V) is coupled through the switch to the wireline loop.

Once the voltage appropriate for the identified type of remote termination has been applied to the loop, a data connection may be established between the line card and the remote termination device. If there is a loss of power during the data connection, the routine described above is reinitiated. In addition, the quality of the digital signal is continuously monitored. In response to an unacceptable degradation in signal quality, the link is first checked for the presence of loop current. If loop current is present, the data connection is reestablished. If there is no loop current, however, the entire routine is reinitiated.

DETAILED DESCRIPTION

Figure 1:
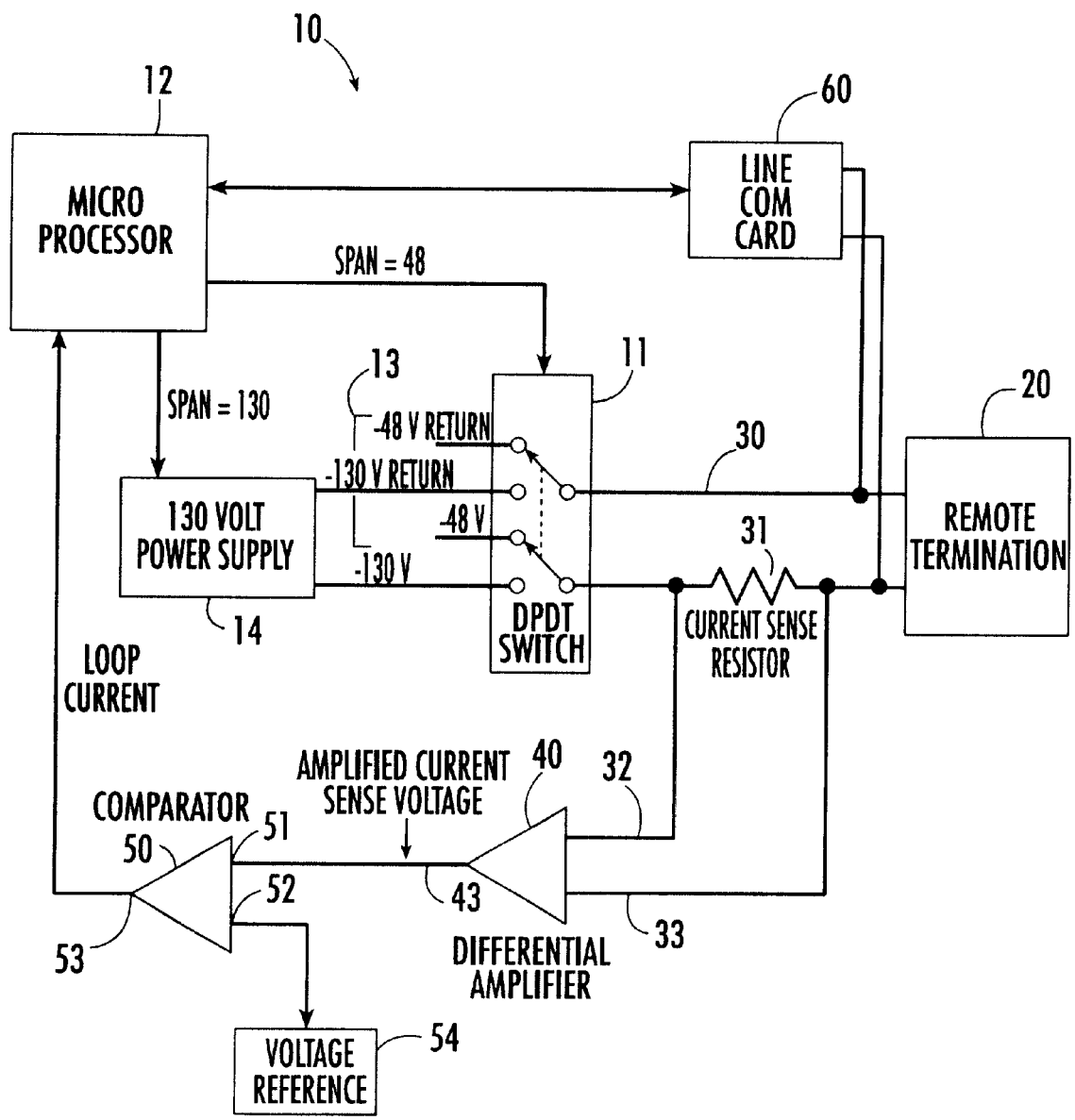
FIG. 1 diagrammatically illustrates the architecture of the automatic remote termination sensing and wireline-powering mechanism of the invention.

Before describing in detail the automatic remote termination sensing and wireline-powering mechanism of the present invention, it should be observed that the invention resides primarily in a prescribed arrangement of conventional communication circuits and associated digital signal processing components and attendant supervisory control circuitry therefor, that controls the operations of such circuits and components. Consequently, the configuration of such arrangements of circuits and components and the manner in which they are interfaced with other equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Attention is initially directed to FIG. 1, wherein the architecture of the automatic remote termination sensing and wireline-powering mechanism of the invention is diagrammatically illustrated. As described briefly above, and as shown in FIG. 1, the sensing and loop powering mechanism of the invention is readily installed in the central office switching bay of a telecommunication service provider, from which telecommunication (telephony/data) service to termination devices located in customer premises sites remote with respect to the central office. A remote termination 20 of a respective customer premises site is coupled to receive service by way of a respective copper wireline loop 30, sourced from the central office 10.

Within the central office,. the sensing and loop powering mechanism comprises a double-pole, double-throw (DPDT) relay 11 that is operative, under the control of a supervisory microprocessor 12, to selectively apply to the wireline loop 30 one of two loop-powering voltages (+/−48 volts, +/−130 volts), respectively provided by an SELV supply 13 and a span supply 14. As shown in FIG. 1, the default connection condition for the relay 11 is the +/−48 volt supply. Not only does this insure compliance with the above-referenced UL requirement that any voltage supplied from the telephone company's central office and made available at a customer's premises be SELV (currently defined as a voltage no greater than 60 volts), but it is a readily available voltage, as most central offices provide power through a +/−48V battery system.

Figure 2:
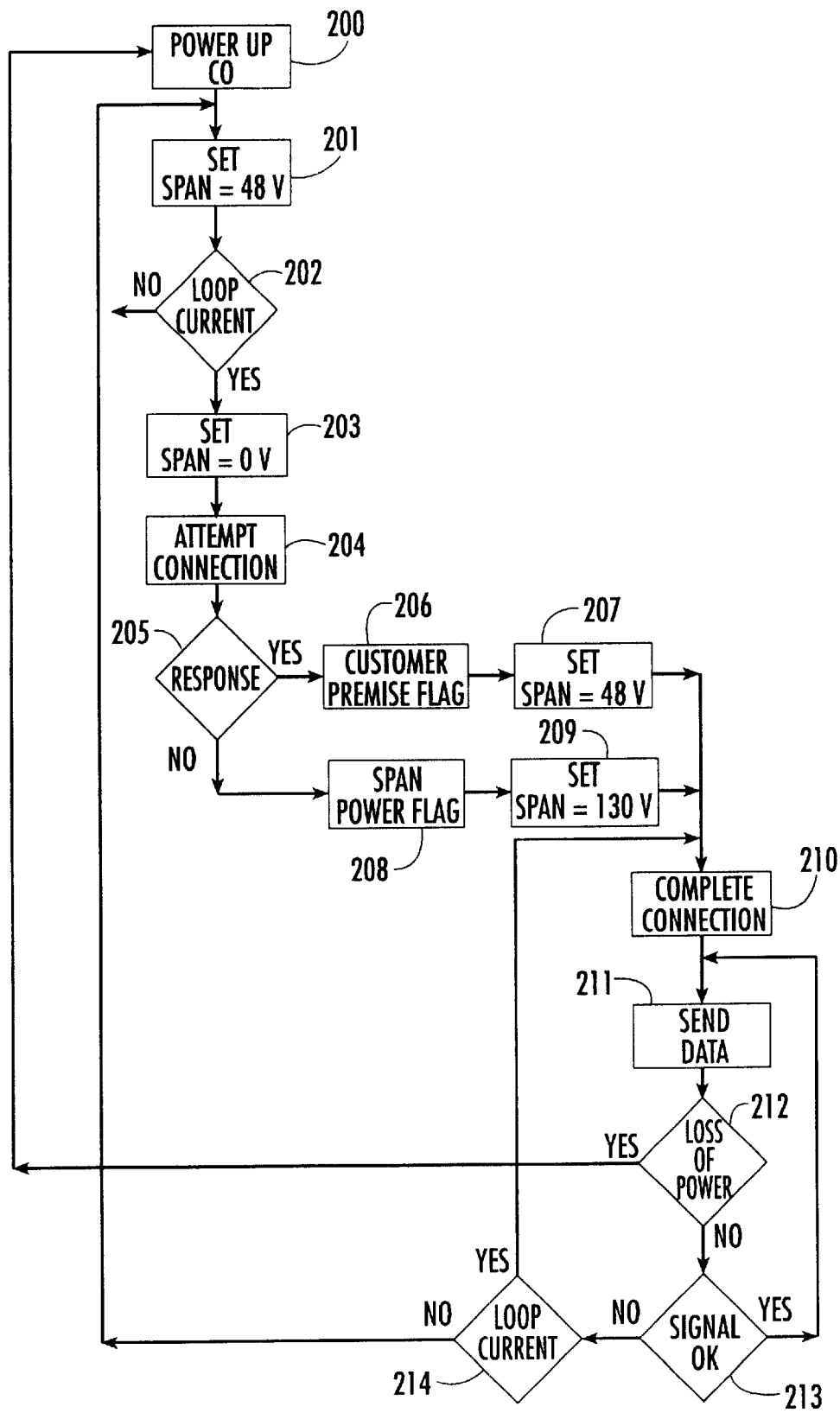
FIG. 2 is a flow chart of the remote termination sensing and wireline-powering routine executed by the supervisory control processor of the architecture of FIG. 1.

A relatively small valued loop current resistor 31 is installed in the wireline loop for detecting loop current. End terminals of the resistor 31 are coupled over links 32 and 33 to a differential amplifier 40, the output 43 of which is an amplified voltage that is representative of the magnitude of current flowing in the wireline. This amplified voltage is coupled to a first input 51 of a comparator 50, a second input 52 of which is coupled to a reference voltage source 54. The output 53 of comparator 50 is coupled to the control processor 12. Control processor 12 is programmed to execute the remote termination sensing and wireline powering routine shown in the flow chart of FIGS. 2, including the operation of a standard digital communication line card 60, as follows.

Before it can be determined what power is to be applied to a line under test, it is necessary to detect whether the wireline 30 is actually connected to a remote termination. For this purpose, after power up in step 200 of the routine of FIG. 2, a low SELV type voltage is applied to the loop in step 201, by turning on the +/−48 volt (default) supply for the relay 11. Once this SELV voltage is turned on, the voltage across the current sense resistor 31 is monitored in query step 202 for the presence of loop current. If there is no loop current (the answer to query step 202 is NO), then it is inferred that there is no remote termination and the central office leaves the wireline 30 coupled to the (+/−48V) SELV voltage via the loopback to step 201, until loop current is detected. Once loop current is detected (the answer to query step 202 is YES), it is inferred the wireline 30 is coupled to a remote termination device, and the routine must determine what type of remote termination 20 is at the far end of the loop 30.

To this end, in step 203, the connection with the +/−48v supply 13 is interrupted, so as to reduce the voltage applied to the loop 20 from the default SELV to zero volts. Next, in step 204, using the line card 60, a digital communication connection over the loop 30 with the remote termination 20 is attempted. It should be noted that a span-powered termination will not be able to communicate unless it is receiving power through the wireline loop 30. In contrast, a locally powered remote termination does not need loop current to communicate. With the loop voltage reduced to zero volts, a communication with the remote termination 20 can be attempted.

If there is a response from the remote termination device 20 (the answer to query step 205 is YES), it is inferred that the remote termination is piece of locally powered customer premises equipment, rather than a span-powered device. In this case, in step 206, a customer premises flag is set in the microprocessor 12. Next, in step 207, with the customer premises flag set, a set SPAN voltage=48V signal is asserted, and the loop voltage is changed back to 48 volts to provide sealing current to the wireline loop 30.

On the other hand, if the answer to query step 205 is NO, it is inferred that the remote termination 20 is a span-powered device, and the routine transitions to step 208, wherein a span power flag is set in the microprocessor. Next, in step 209, a set SPAN voltage=130 V signal is asserted, and the 130 V supply 14 is turned on. Also, the relay 11 is operated to couple the wireline loop 30 to the span power supply 14.

Once the routine has determined the type of remote termination and completed the wireline powering connection in either of steps 207 or 209, it transitions to step 210, wherein a data connection is established between the line card 60 and the remote termination device 20. With a data connection established, data is transmitted in step 211. If there are no problems with the connection, data continues to be transmitted. However, should there be a loss of power —the answer to step 212 is YES, the routine transitions back to step 200 and the process is restarted.

As long as there is no loss of power (the answer to step 212 is NO), the routine continues to check the quality of the digital signal on the wireline link 30 in step 213. Unless there is an unacceptable degradation in signal quality (the answer to step 213 is YES), the routine loops back to step 211 and data continues being sent over the wireline loop. However, for an unacceptable degradation in signal quality (the answer to step 213 is NO), the routine transitions to step 214, wherein the link is checked for the presence of loop current. If the answer to step 214 is YES, indicating that loop current is present, then before data transmission can proceed, a digital connection must be reestablished in step 210. If there is no loop current (the answer to step 214 is NO), the routine transitions back to step 201 and the process is reinitiated.

As will be appreciated from the foregoing description, the above-described problem of having to purchase and stock two types of central office loop powering devices, and the possibility of erroneously connecting a high voltage to a wireline loop terminated by locally powered customer's premises equipment, are effectively obviated by the central office-installable line powering mechanism of the invention, which automatically determines the termination device is span-powered, or is locally powered, and then powers the wireline link with a voltage that is appropriate for the determined type of termination device. The invention not only eliminates the need for two separate central office loop-powering devices, but ensures that nothing higher than an SELV is supplied to the wireline link unless and until it has been determined that the loop is terminated by locally powered customer premises equipment.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communication system having a wireline link coupled between a first site at which a powering condition of said wireline link is effected and a second site at which termination equipment is coupled to said wireline link, a method of establishing a powering condition of said wireline link appropriate for said termination equipment comprising the steps of:

(a) stimulating said wireline link from said first site in a manner that will evoke a response thereon by said termination equipment indicative of whether said termination equipment is locally powered exclusive of said wireline link or is to be powered by way of said wireline link; and (b) applying a first power condition to said wireline link in response to the response evoked in step (a) indicating that said termination equipment is locally powered exclusive of said wireline link, and a second power condition to said wireline link, from said first power condition, in response to the response evoked in step (a) indicating that said termination equipment is to be powered by way of said wireline link, and wherein each of said first and second power conditions provides sealing current through said wireline link.

2. For use with a communication system having a wireline link coupled between a first site at which a powering condition of said wireline link is effected and a second site at which termination equipment is coupled to said wireline link, a method of establishing a powering condition of said wireline link appropriate for said termination equipment comprising the steps of:

(a) stimulating said wireline link from said first site in a manner that will evoke a response thereon by said termination equipment indicative of whether said termination equipment is locally powered exclusive of said wireline link or is to be powered by way of said wireline link; and (b) applying a first power condition to said wireline link in response to the response evoked in step (a) indicating that said termination equipment is locally powered exclusive of said wireline link, and a second power condition to said wireline link, from said first power condition, in response to the response evoked in step (a) indicating that said termination equipment is to be powered by way of said wireline link, further including the steps of:

(c) establishing a data communication connection between said first and second sites;

(d) in response to a deterioration of said communication connection established in step (c), monitoring said wireline link for the presence of loop current; and (e) in response to detecting the presence of loop current in step (d), terminating the data communication connection established in step (c), and reattempting to establish a data communication connectivity between said first and second sites, but in response to failing to detect the presence of loop current in step (d), repeating steps (a)–(c).

3. For use with a communication system having a wireline link coupled between a first site at which a powering condition of said wireline link is effected and a second site at which termination equipment is coupled to said wireline link, a method of establishing a powering condition of said wireline link appropriate for said termination equipment comprising the steps of:

(a) stimulating said wireline link from said first site in a manner that will evoke a response thereon by said termination equipment indicative of whether said termination equipment is locally powered exclusive of said wireline link or is to be powered by way of said wireline link; and (b) applying a first power condition to said wireline link in response to the response evoked in step (a) indicating that said termination equipment is locally powered exclusive of said wireline link, and a second power condition to said wireline link, from said first power condition, in response to the response evoked in step (a) indicating that said termination equipment is to be powered by way of said wireline link, and wherein step (a) includes the steps of:

(a1) stimulating said wireline link to detect whether termination equipment is coupled to said wireline link, and (a2) in response to detecting that termination equipment is coupled to said wireline link, changing the stimulation of said wireline link from step (a), and attempting to establish a communication over said wireline link with said termination equipment; and wherein step (b) comprises, in response to step (a2) successfully establishing a communication over said wireline with said termination equipment, applying said first power condition to said wireline link, but in response to step (a2) failing to establish a communication over said wireline link with said termination equipment, applying said second power condition to said wireline link.

4. A method according to claim 3, wherein step (a1) includes applying a safety extra low voltage to said wireline link to cause the flow of loop current through said wireline link, and wherein step (a2) comprises applying a zero voltage condition to said wireline link, and transmitting a message over said wireline link to said termination equipment at said second site.

5. A method according to claim 4, wherein step (b) comprises, in response to receipt of a reply from said termination equipment to said message transmitted in step (a2), applying a safety extra low voltage to said wireline link.

6. A method according to claim 5, wherein said safety extra low voltage has a magnitude on the order of 48 volts.

7. A method according to claim 4, wherein step (b) comprises, in response to receiving no reply from said termination equipment to the message transmitted in step (a2), applying a span powering voltage in excess of said safety extra low voltage to said wireline link.

8. A method according to claim 7, wherein said span powering voltage has a magnitude on the order of 130 volts.

9. A method according to claim 3, wherein step (a1) includes applying a safety extra low voltage to said wireline link to cause the flow of loop current through said wireline link.

10. For use with a communication system having a wireline link coupled between a first site at which a powering condition of said wireline link is effected and a second site at which a termination device is coupled to said wireline link, a method of establishing the appropriate powering condition of said wireline link appropriate for said termination device comprising the steps of:

(a) applying a first voltage to said wireline link that is sufficient to cause the flow of loop current to a termination device coupled to said wireline link;

(b) monitoring said wireline for loop current;

(c) in response to detecting loop current in step (b), removing said first voltage from said wireline link, and applying a stimulus to said wireline link, which is effective to provide an indication of whether power for said termination device is to be supplied by or is exclusive of said wireline link; and (d) selectively applying one of respectively different second and third voltages to said wireline link in accordance with said indication provided in step (c).

11. A method according to claim 10, wherein said first and second voltages are safety extra low voltages, and said third voltage is in excess of a safety extra low voltage sufficient to power said termination device from said first site.

12. A method according to claim 11, wherein step (c) comprises:

(c1) changing said safety extra low voltage to zero volts, and attempting to conduct data communications over said wireline link with said termination device;

(c2) in response to step (c1) successfully establishing data communications over said wireline link with said termination device, applying a safety extra low voltage to said wireline communication link so as to establish loop current therein without causing damage to said termination device, but in response to step (c1) failing to establish data communications over said wireline link with said termination device, applying said third voltage to said wireline link.

13. An apparatus for supplying to a wireline link that couples a service provider site to a termination device at a subscriber site with power appropriate for said termination device comprising:

a coupling device that is selectively controllable to apply a plurality of respectively different electrical stimuli to said wireline link; and a condition sensing controller that is operative to determine the type of termination device installed at said subscriber site by monitoring an electrical condition of said wireline link for each of the respectively different electrical stimuli applied to said wireline link by said coupling device, and to supply prescribed power through said coupling device to said wireline link in accordance with the type of termination device determined to be installed at said subscriber site, wherein said prescribed power provides sealing current through said wireline link.

14. An apparatus according to claim 13, wherein said controller is operative to stimulate said wireline link to detect whether termination equipment is coupled to said wireline link and, in response to detecting termination equipment, to change the stimulation of said wireline link and attempt to establish a communication over said wireline link with said termination equipment and, in response to successfully establishing a communication over said wireline with said termination equipment, applying a first power condition to said wireline link, but in response to failing to establish a communication over said wireline link with said termination equipment, applying a second power condition to said wireline link.

15. An apparatus according to claim 14, wherein said controller is operative to apply a safety extra low voltage to said wireline link to cause the flow of loop current through said wireline link to detect that termination equipment is coupled to said wireline link, and to thereafter apply a zero voltage condition to said wireline link, and transmit a message over said wireline link to said termination equipment at said second site and, in response to receipt of a reply from said termination equipment to said message to apply a safety extra low voltage to said wireline link.

16. An apparatus according to claim 15, wherein said controller is operative, in response to receiving no reply from said termination equipment to said message to apply a span powering voltage in excess of said safety extra low voltage to said wireline link.

17. An apparatus according to claim 16, wherein said safety extra low voltage has a magnitude on the order of 48 volts, and wherein said span powering voltage has a magnitude on the order of 130 volts.

* * * * *